Patented Aug. 1, 1939

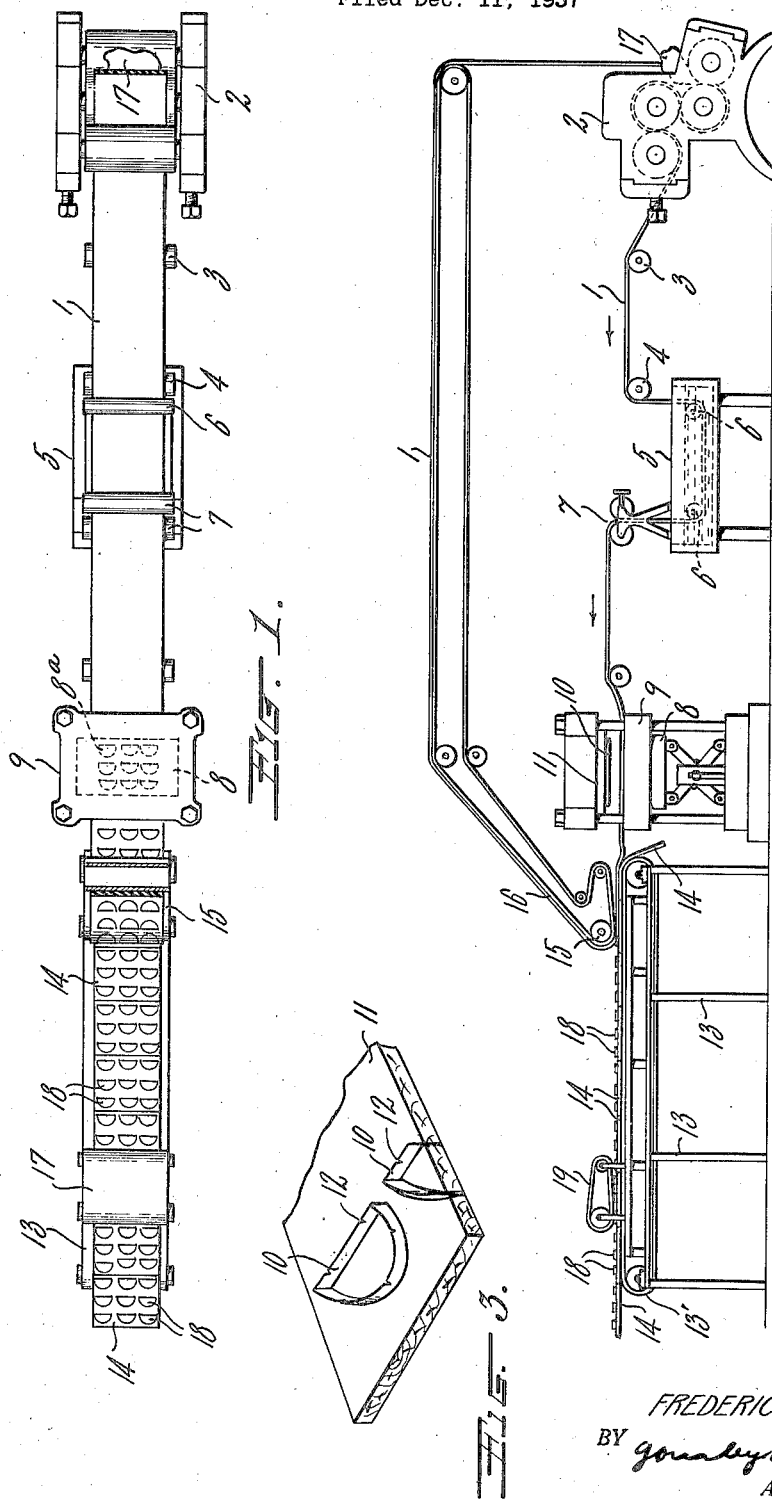

2,167,734

UNITED STATES PATENT OFFICE 2,167,734

METHOD OF CUTTING BLANKS FROM PLASTIC STRIP MATERIAL

Frederick Zonino, Naugatuck, Conn., assignor, by mesne assignments, to United States Rubber Company, New York, N. Y., a corporation of New Jersey Application December 11, 1937, Serial No. 179,341

1 Claim. (Cl. 18—48)

My invention relates to methods of cutting blanks from plastic strip material, and more particularly to methods of cutting and removing unvulcanized rubber blanks from a continuous strip of rubber composition in more or less tacky condition. One application of the invention is in the preparation of rubber blanks for shoe parts.

It has heretofore been proposed to cut blanks from a continuous strip of plastic composition, such as an unvulcanized rubber composition, by disposing a rubber strip over mats resting on a conveyor. The cutting die works against the mats in the cutting operation. Thereafter the mats and the continuous strip scrap are separated with the blanks remaining on the mats. In such a process it has been found that the mats, which are usually of fibre composition, tend to become distorted and warped as a result of applied pressure. Also the surfaces of the mats tend to become marred by the cutting dies so that after some use the mats may give the plastic blanks undesired creases or wrinkles corresponding to the former die marks in the mats. Also, if it is desired to pile or hang the mats, the warping or distortion prevents them from hanging or being piled smoothly. In extreme cases the mats may become so distorted that rubber blanks adhering thereto are brought into engagement with an adjacent mat.

In practicing the present invention, the cutting mats are not applied until after the cutting operation. By partially cutting the blanks from the strip at the die, thereby leaving thin connecting webs, the plastic material may thereafter be placed on the mats on a conveyor and be pressed thereagainst. The continuous strip of scrap is then moved out of the path of the mats and the thin webs are pulled apart by the separating movement. The blanks adhere to the mats with a sufficient tenacity to overcome the tearing force.

The accompanying drawing illustrates a present preferred embodiment of the apparatus for practicing the invention, in which:

Fig. 1 is a plan view, partially in section, of the apparatus;

Fig. 2 is a side view thereof; and

Fig. 3 is a perspective view of a portion of the cutting die.

Referring to the drawing, a continuous strip of plastic stock 1, such as a plastic rubber composition, is processed by a calender 2 for obtaining the desired gauge and surface design. From the calender the stock 1 passes over rolls 3 and 4 to a cooling tank 5 which may be of any suitable type. Guide rollers 6 in the tank serve to hold the stock 1 under the surface of the cooling medium, preferably water. The tank 5 is not large enough to completely cool the stock, as it is only desired to take away the surface heat from the stock thereby making it less difficult to handle and permitting it to pass across the platen of a cutting press, hereafter described. A pair of squeeze rolls 7 mounted above the tank 5 serve to remove the water remaining on the surface of the stock.

From the tank 5 the stock passes to a cutting press 8, illustrated in the form of a toggle press. The press has a lower platen 9 which moves vertically for lifting the stock against one or more dies 10 mounted on a base or a top platen 11. The platen 9 is reciprocated in any conventional manner, not illustrated. The dies 10 are in the form of thin cutting blades having notches 12 formed therein. The notches are of such a number and size that fine ribs are left between the blanks formed within the dies and the stock strip so that the blanks will be supported by the ribs as the strip advances, but may be easily severed without damaging the blanks, as hereafter described. The cutting dies 10 are so arranged that the scrap remaining after the blanks are formed constitutes a continuous strip.

From the press 8 the stock 1 advances to a conveyor table 13. Adjacent to the press 8, flexible mats 14 of fibre or other material are manually interposed between the strip 1 and the conveyor table 13 so that the strip 1 rests on the mats 14 which, in turn, rest upon the conveyor table 13. A laminating roll 15, disposed above the conveyor, guides a conveyor belt 16 so as to apply pressure against the stock causing it to adhere to the mats 14. The continuous scrap strip is carried by the conveyor belt 16 to a position where it can be returned to a stock bank 17 in the calender 2. The sharp turn of the belt and strip around the pulley 15 is sufficient to disrupt the small ribs attaching blanks 18 to the strip. The adhesion of the blanks 18 to the mats is sufficient to resist the tearing force required to separate the blanks from the strip. Accordingly the mats 14 with the mounted blanks 18 continue on the conveyor 13 while the scrap returns to the calender 2. If desired, an additional laminating belt 19 may be provided for pressing the blanks 18 firmly against the mats before the mats are removed from the conveyor table 13. The mats 14, after being removed from the conveyor table 13 may be handled or stored in any suitable manner.

According to my invention, blank shapes are partially severed from a continuous strip of plastic material in a cutting press. The strip with the connected blanks is carried to a conveyor where the strip and the blanks are disposed over mats on the conveyor. Thereafter the blanks and scrap are separated, leaving the blanks on the mats.

In accordance with my method, the mats are not subjected to any action by the cutting dies and therefore they have much longer life and much more satisfactory use than do mats which are called upon to resist the action of the cutting dies.

While I have shown and described a present preferred method of practicing my invention, it may be understood that it may be otherwise practiced within the spirit thereof and the scope of the appended claim.

Having thus described my invention, what I claim and desire to protect by Letters Patent is:

In the method of forming blanks from a continuous strip of plastic material, the steps comprising moving the material through a press, nearly completely severing blanks from the material while leaving a continuous strip of scrap material with webs of such amount as will support the nearly severed blanks but which will tear when the strip and lanks are pulled away from each other, thereafter disposing the strip of material on mats mounted on a conveyer, pressing the strip of material on the mats, and moving the continuous scrap material out of the path of movement of the mats, wherey the lanks adhere to the mats and are torn from the scrap material.

FREDERICK ZONINO.

CERTIFICATE OF CORRECTION.

Patent No. 2,167,734. August 1, 1939.

FREDERICK ZONINO.

It is hereby certified that error appears in the printed specification of the above numbered patent requiring correction as follows: Page 2, second column, lines 10 and 15, in the claim, for "lanks" read blanks; line 15, for "wherey" read whereby; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.